July 4, 1961  E. W. REISSNER  2,991,368
MANUFACTURE OF LOADED SHEET MATERIALS
Filed March 25, 1957

Inventor
EDGAR W. REISSNER
By
Emery L. Groff
Attorney

United States Patent Office 2,991,368
Patented July 4, 1961

2,991,368
MANUFACTURE OF LOADED SHEET MATERIALS
Edgar Wilhelm Reissner, Gloucester, England, assignor to Factories Direction Limited, Gloucester, England
Filed Mar. 25, 1957, Ser. No. 648,241
Claims priority, application Great Britain Apr. 10, 1956
3 Claims. (Cl. 250—108)

This invention relates to the manufacture of slabs, boards and other sheet materials, and also to tubes, containing granular or powdered loading materials, particularly materials capable of absorbing nuclear radiations. Such sheet materials will be referred to throughout the specification and claims which follow as "screens."

It is known that screens capable of effectively absorbing slow neutrons can be made from materials impregnated with boron or compounds of boron, but it has not hitherto been found possible to prevent the occurrence of small areas in which the boron is relatively attenuated so as to allow an escape of radiation.

It is an object of the present invention to provide an imroved method of manufacture by which a high degree of uniformity of distribution of a granular or powdered loading material can be obtained consistently in slabs, boards, sheets or tubes of any required dimensions.

It is a further object of the invention to provide a screen adapted to given protection against thermal neutrons comprising a laminate of alternate layers of phenolic resin-impregnated paper alternating with layers of a granular boron compound held in an adhesive medium.

A still further object is the provision of a screen adapted to give protection against both fast and thermal neutrons comprising layers of a hydrogen carrier interleaved with layers of a laminate of boron loaded sheet material.

According to the invention the granular or powdered loading material is incorporated in a slab, board or other sheet or tube in the form of at least one coating applied to an adhesive surface of the sheet by bringing the adhesive surface into contact with a mass of the granular or powdered material.

In the preferred form of the invention the slab, board or other sheet (whether flat or rolled into a tube) is a laminated sheet interleaved with one or more sheets of paper, asbestos, metal or other material which is coated with a granular or powdered loading material by making its surface tacky.

The paper or other sheet may be a thin sheet of plastic material or it may be impregnated or coated with a resin or other adhesive by which it can be caused to adhere to interleaved materials to produce a laminated sheet. It is coated with the granular or powdered material by covering it, whilst its surface is tacky, with a layer of the granular or powdered material of sufficient thickness to ensure that the whole of the surface of the sheet is completely covered with the granular or powdered material. The adhesive used is applied to the paper or like sheet in such quantity that it will cause every grain of material that makes contact with the surface to adhere, but will not spread into the granular or powdered material so as to cause additional granules to stick to those that adhere directly to the paper or like surface. The uniform coating of the granular or powdered material is thus obtained.

The granular or powdered material which we prefer to use for absorbing slow neutrons is either boron or a convenient compound of boron in a dry crystalline, granular or powdered form. A laminated sheet in which layers of boron or a boron compound are interleaved with wood sheets may be constructed so as to produce a board in which the action of hydrogen is combined with that of boron for slowing and absorbing nuclear radiations. The hydrogen atoms contained in the wood layers (in addition to those contained in any paper or like sheets used) slow down fast neutrons whereas the boron captures slow neutrons and neutrons that have been slowed down by the hydrogen.

In order that the invention may be thoroughly understood some screens in accordance with it will be described in some detail, by way of example, with reference to the accompanying drawings in which.

Figure 1:
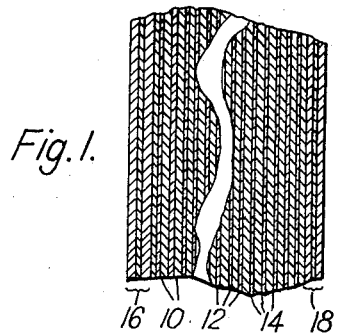
FIGURE 1 is a cross section of a laminated screen for protection against thermal neutrons.

The screen shown in FIGURE 1 is for protection against thermal neutrons. It comprises layers 10 of a phenolic resin-impregnated paper film such as that made under the trade name "Tego," between which are carried layers 12 of boric oxide bound in thin phenolic resin layer 14.

Some 15 g. of elemental boron is required to every 100 sq. cms. for an attenuation factor of 100. This is equivalent to 50 g. of boric oxide or 100 g. of boric acid. In accordance with the invention, this quantity of boric oxide can be carried by some 25 laminations of paper film 10.

The screen is made by coating the separate sheets 10 of paper film on one side with a thin layer of the phenolic resin 14. The powdered loading material 12, in this case boric oxide, is poured over the adhesive surface provided by the still tacky resin which readily captures a single layer.

The boron-loaded sheets (FIGURE 2) thus formed are laid up and laminated under a pressure of say 300 lbs./sq. in. at a temperature of 140° C. for a time dependent upon the number of layers.

In the present case with some 25 layers approximately 12–15 minutes are sufficient. The temperature is preferably reduced to below 100° C. before the pressure is released.

The laminate produced may conveniently be faced with layers of plywood 16 and 18 or the like, for the sake of appearance.

Figure 2:
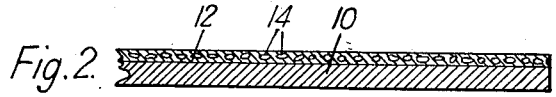
FIGURE 2 is an enlarged cross section of a single layer of the screen shown in FIGURE 1.

In order to provide a screen against fast neutrons hydrogen is introduced in the form of layers of wood veneer interleaved between layers of boron-loaded paper film of the type described with reference to FIGURES 1 and 2. Such a screen is shown in FIGURE 3.

Figure 3:
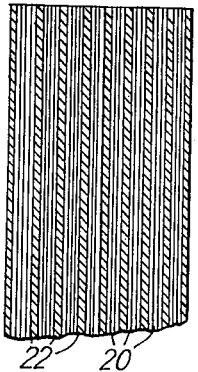
FIGURE 3 is a cross section of a screen for protection against fast and thermal neutrons employing laminated wood veneer.

FIGURE 3 shows a screen comprising layers 20 of wood veneer interleaved at 1 inch intervals between layers 22 of boron-loaded impregnated paper film.

The effect of the hydrogen introduced in the wood veneer is to slow down the fast neutrons which are then captured by the boron in the loaded layers.

Laminating pressures of up to 2,000 lbs./sq. in. are used to densify the wood layers to provide the maximum amount of hydrogen atoms in the maximum space. Under these circumstances some 8 inches of wood are required to produce a 100 fold attenuation of fast neutrons. Figures of merit are usually quoted for the 10 fold attenuation length which in the case of densified wood is approximately 4 inches.

Figure 4:
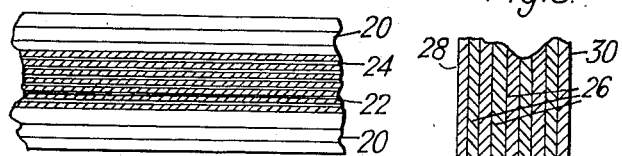
FIGURE 4 is an enlarged detail of FIGURE 3.

The screen shown in FIGURE 3 comprises 8 layers of laminated wood veneer 20 each 1 inch thick, with 9 layers of boron loaded material 22, each layer consisting of some 6 sheets of "Tego" or the like, loaded with boric oxide in the manner described with reference to FIGURES 1 and 2 with an additional layer 24 of "Tego" film where the wood veneer face would otherwise be adjacent to the boric oxide powder (FIGURE 4). Such a screen will give 100 fold attenuation of both fast and thermal neutrons.

Figure 5:
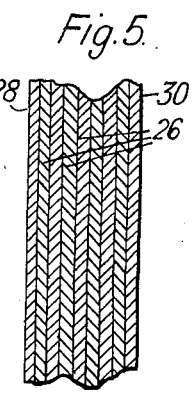
FIGURE 5 is a cross section of a modifimation of the composite screen shown in FIGURE 3.

An alternative arrangement of a screen adapted to give protection against both fast and thermal neutrons is shown in FIGURE 5. In this case an 8 inch layer of laminated wood veneers 26, densified as described above, are arranged between two layers 28 and 30 of boron loaded paper film each layer comprising some 25 sheets of "Tego" or the like loaded with boric oxide in the manner described with reference to FIGURES 1 and 2.

The thicknesses and densities of the wood layers, the densities of the boron layers and the numbers of interleaved layers of wood and boron may be varied within wide limits according to the character of the radiation to be dealt with and the degree of screening required. It will be apparent to those skilled in the art that where boron and hydrogen are both used in the same screen, calculations have to be made separately. The values given above give a good guide to the requirements for any specific application.

Other interleaved materials containing hydrogen may be used instead of wood if required. In one form of the invention the hydrogen carrier is a solid paraffin, which may be made tacky by heating. In another form the hydrogen carrier is polyethylene.

Many possible variations in the above described stratification of boron-and-hydrogen-containing layers within the scope of the invention will be apparent.

I claim:
1. The method of forming a laminated radiation shield for at least absorbing thermal neutrons comprising treating each of a plurality of sheets of supporting material at at least one surface thereof with an adhesive material, completely covering each of said sheets at the so-treated surface thereof with a layer of granular boron-containing material, the amount of said adhesive material used for each sheet being such that each grain of boron-containing material directly contacting said adhesive material treated surface adheres thereto and forms a voidless layer without the spreading of said adhesive material into the grains of said boron-containing material layer to cause additional grains to adhere to said directly contacting grains adhering to said supporting material surface, and laminating said plurality of said so-treated sheets under the required pressure at the required temperature for a period of time dependent upon the number of so-formed treated supporting sheets.

2. A laminated radiation shield for at least absorbing thermal neutrons comprising a plurality of alternate layers of a supporting sheet having a voidless layer comprising an adhesive material layer on at least one surface thereof and a layer of boron-containing material bound in said adhesive material layer.

3. A laminated radiation shield for both absorbing thermal neutrons and moderating fast neutrons comprising a plurality of layers of solid paraffin alternating with layers of a supporting sheet having a voidless layer comprising an adhesive material layer on at least one surface thereof and a layer of boron-containing material bound in said adhesive material layer.

References Cited in the file of this patent

UNITED STATES PATENTS

| | | |
|---|---|---|
| 341,587 | Macrone | May 11, 1886 |
| 1,228,371 | Haefely | May 29, 1917 |
| 1,866,372 | Rohlfs | July 5, 1932 |
| 2,054,444 | Pinten | Sept. 15, 1936 |
| 2,459,851 | Story | Jan. 25, 1949 |
| 2,796,411 | Zirkle et al. | Jan. 18, 1957 |
| 2,796,529 | Morrison | June 18, 1957 |
| 2,807,727 | Fermi et al. | Sept. 24, 1957 |
| 2,858,451 | Silversher | Oct. 28, 1958 |

OTHER REFERENCES

Levey: Abstract Ser. No. 49,649, published in O.G., vol. 665, pp. 1314, 1315, Dec. 23, 1952.